United States Patent [19]

Armstrong

[11] Patent Number: 4,948,395

[45] Date of Patent: Aug. 14, 1990

[54] CHIRAL SEPARATION MEDIA

[75] Inventor: Daniel W. Armstrong, Rolla, Mo.

[73] Assignee: Advanced Separations Technologies Inc., Whippany, N.J.

[21] Appl. No.: 406,141

[22] Filed: Sep. 12, 1989

[51] Int. Cl.[5] .............................................. B01D 15/08
[52] U.S. Cl. .......................................... 55/67; 55/386; 536/46
[58] Field of Search ........................... 55/67, 197, 386; 536/46

[56] References Cited

U.S. PATENT DOCUMENTS

| | | | |
|---|---|---|---|
| 3,453,257 | 7/1969 | Parmerter et al. | 536/46 |
| 3,453,258 | 7/1969 | Parmerter et al. | 536/46 |
| 3,453,259 | 7/1969 | Parmerter et al. | 514/58 |
| 3,459,731 | 8/1969 | Gramera et al. | 536/103 |
| 3,459,732 | 8/1969 | Hull et al. | 536/46 |
| 4,426,292 | 1/1984 | Wernick et al. | 55/67 X |
| 4,482,709 | 11/1984 | Iwao et al. | 536/46 |
| 4,638,058 | 1/1987 | Brandt et al. | 536/46 X |
| 4,727,064 | 2/1988 | Pitha | 514/58 |
| 4,867,884 | 9/1989 | Rendleman, Jr. | 536/46 X |

FOREIGN PATENT DOCUMENTS

| | | | |
|---|---|---|---|
| 2403098 | 5/1979 | France | 55/386 |
| 57-097446 | 6/1982 | Japan | 55/386 |
| 60-248729 | 12/1985 | Japan | 536/46 |

OTHER PUBLICATIONS

W. Konig et al., "Cyclodextrins as Chiral Stationary Phases in Capillary Gas Chromatography", *Journal of Chromatography*, 447 (1988), 193–97.

W. Konig, "Enanatioselective Gas Chromatography with Modified Cyclodextrins as Chiral Stationary Phases".

Macherey-Nagel, "The Separation of Chiral Molecules and Control of Optical Purity by TLC, GLC, HPLC".

*Primary Examiner*—Robert Spitzer
*Attorney, Agent, or Firm*—Lucas & Just

[57] ABSTRACT

The media is permethylated hydroxy ether of cyclodextrin and is used in capillary gas chromatographic columns.

9 Claims, No Drawings

CHIRAL SEPARATION MEDIA

This invention relates to a composition used for separation of optical isomers or chiral compounds, as well as other isomeric and non-isomeric compounds, by means of gas chromatography and, more particularly, to the separation of enantiomers by capillary gas chromatography. The media used is a permethylated hydroxy ether of cyclodextrin.

The configuration of a chiral molecule is generally what determines its biological and pharmaceutical activity and effectiveness. One of the enantiomers of the chiral molecule may be active and the other may be inactive or even toxic. It is thereby essential to be able to separate the different enantiomers from each other so as to be able to have an isolated enantiomer in pure form.

A conventional way to separate enantiomers is by gas chromatography using a chiral stationary phase. Resolution of enantiomers in this manner is generally thought to be due to one or a combination of dispersion forces, dipolorinteractions and the hydrogen bonding interactions between the chiral stationary phase and the enantiomer.

Most of the early work on chiral stationary phases for gas chromatography used amino acids peptides, and various derivatives thereof. Some efforts have been made to use other naturally occurring chiral molecules as chiral stationary phases such as tartaric acid, malic acid, mandelic acid and chrysanthemic acid. Despite a large amount of work in this area, the only resulting widely available and commercially viable chiral stationary phase for gas chromatography has been Chirasilval from Macherey-Nagel of the Federal Republic of Germany which consists of a siloxane copolymer to which L-valine-tert-butylamide was coupled.

There are a number of limitations to these early amino acid based gas chromatography chiral stationary phases. First, they do not seem to be widely applicable. Most of the reported separations were of racemic amino acid derivatives. Just as significant was the fact that, using these early chiral separation phases, the high column temperature needed for gas chromatography often results in racemization, decomposition and bleeding of the chiral stationary phase. Even the moderately successful Chirasilval is not recommended to be used at temperatures much above 200° C. Also, the enantioselectivity of the chiral stationary phase decreases significantly at the higher temperatures needed for gas chromatography.

Previously there have been a number of efforts to use alpha- and beta-cyclodextrin as gas chromatography stationary phases. It was apparent from the early gas chromatography and more recent liquid chromatography work that cyclodextrins had potential as gas chromatographic stationary phases. Unfortunately, the cyclodextrin gas chromatography stationary phases were not as successful as the liquid chromatography bonded stationary phases. Although interesting selectivities, mainly for achiral solutes, were obtained, the efficiency and reproducibility were less than desirable. Cyclodextrins are crystalline solids and had to be dissolved or suspended in another solvent prior to coating the separation column. The fact that native cyclodextrins and their simple derivatives (dimethyl, acetyl, etc.) are crystalline solids with high melting or decomposition points, makes them difficult to use as gas chromatography stationary phase coatings. Recently, there have been reports on derivatized cyclodextrins that are liquids and therefore can be used directly as stationary phase coatings. All of these previous compounds are lipophilic derivatives of cyclodextrin (such as perpentyl-beta-cyclodextrin).

Cyclodextrins (also called "Schardinger dextrins") are known to be cyclic oligosaccharides composed of glucose residues bonded together by alpha 1,4 bonds. The six, seven and eight membered rings are called alpha-, beta-, and gamma-cyclodextrin, respectively. The cyclodextrins have different chemical and physical properties from the linear oligosaccharides derived from starch in that they are non-reducing dextrins and the ring structure is widely used as a host for the inclusion of various compounds, usually organic compounds for the food, pharmaceutical, and chemical fields.

As is also well-known, cyclodextrins are produced from starch of any selected plant variety such as corn, potato, waxy maize and the like which may be modified, or unmodified starch derived from cereal or tuber origin and the amylose or amylopectin fractions thereof. The selected starch in aqueous slurry at selected concentrations up to about 35% by weight solids is usually liquefied as by gelatinization or treatment with a liquefying enzyme such as bacterial alpha-amylase enzyme and then subjected to treatment with a trangylcosylase (CGT) enzyme to form the cyclodextrins.

The amount of the individual alpha-, beta- and gamma-cyclodextrins produced by treating the starch with the CGT enzyme will vary depending on the selected starch, selected CGT enzyme and processing conditions. The parameters to select for the CGT enzyme conversion for the desired result in the amount of each individual cyclodextrin to be produced is conventional and well-described in the literature.

Conventionally, the DE of the liquefied starch is maintained below about 20 DE, the starch solids concentration is below about 35% by weight, the pH for conversion may be about 4.5 to 8.5 at a selected temperature from ambient up to about 75° C. for a selected period of time, typically from about 10 hours up to seven days and more. The amount of CGT enzyme used for conversion is conventional and well-known in the art.

It has now been discovered that a permethylated hydroxy ether of cyclodextrin can be used to separate optical isomers. The permethylated hydroxy ether of cyclodextrin is hydrophilic and relatively polar compared to previous cyclodextrin derivatives used as chiral stationary phases. The permethylated hydroxy ether of cyclodextrin has better coating properties on fused silica capillaries than the hydrophobic cyclodextrin derivatives. The permethylated hydroxy ether of cyclodextrin has different selectivities than the hydrophobic cyclodextrin derivatives. The permethylated hydroxy ether of cyclodextrin can be used at higher temperatures than Chirasilval without racemization. The degree of substitution (DS) of the hydroxy ether groups for the hydroxyl groups on the underivatized cyclodextrin molecule is between about 10% to about 75% of the available hydroxyl groups on the cyclodextrin. For example, for alpha-cyclodextrin the DS for the hydroxy ether groups is about 2 to about 12; for beta-cyclodextrin, about 2 to about 14; and for gamma-cyclodextrin, about 2 to about 16. More preferably, the DS is about 25 to about 60% of the available sites and more preferred is about 40%. It is important that the degree of substitution of the cyclodextrin hydroxy groups by the ether side chains be random and non-uniform. The DS of each individual cyclodextrin must not be identical.

The DS of the methyl groups for the remaining hydroxyl groups on the cyclodextrin and the hydroxyl groups on the ether side chains of the cyclodextrin is greater than about 90% and more preferably above about 95%. Ideally, all of the available hydroxyl sites on the hydroxy ether of cyclodextrin are methylated; although this is sometimes difficult to achieve.

The permethylated hydroxy ether of cyclodextrin is made in a conventional manner starting from either individual cyclodextrin or mixtures of the alpha-, beta- and/or gamma-cyclodextrins. However, it is preferred to use only a single cyclodextrin, i.e. either alpha-, beta-, or gamma-cyclodextrin. The separation and/or purification of the alpha-, beta-, and gamma-cyclodextrin may be done before, after, or at any stage of the derivatization process. The procedure for making the hydroxy ether of cyclodextrin and the subsequent step of methylating are accomplished in a conventional manner. The order of reaction for forming the cyclodextrin derivative is first to make the hydroxy ether and then methylation.

In order to etherify the cyclodextrin, the cyclodextrin is suitably reacted with an epoxide. Suitable epoxides include ethylene oxide, propylene oxide, butylene oxide, amylene oxide, glycidol (hydroxypropylene oxide), butadiene oxide, glycidyl methyl ether, glycidyl isopropyl ether, alkyl glycidyl ether, styrene oxide, and t-butyl glycidyl ether. Preferably, the epoxide is selected from the group consisting of propylene oxide, glycidyl methyl ether, glycidyl isopropyl ether, alkyl glycidyl ether, t-butyl glycidyl ether and styrene oxide. Good results have been obtained with an epoxide selected from the group consisting of propylene oxide, glycidyl methyl ether and glycidyl isopropyl ether.

As is known, the reaction of cyclodextrin with the above noted epoxides produces an ether of cyclodextrin with two hydroxy groups on adjacent carbon atoms on the side chains. Such hydroxy ethers of cyclodextrin are sometimes referred to as dihydroxyalkyl ethers of cyclodextrin.

The preferred ethers of cyclodextrin for use in the present invention include hydroxy propylated cyclodextrin, hydroxy propylated methyl ether cyclodextrin, hydroxy propylated isopropyl ether cyclodextrin, hydroxy propylated vinyl ether cyclodextrin, hydroxy propylated t-butyl ether cyclodextrin, and hydroxy ethylated phenyl cyclodextrin. Good results have been obtained with hydroxy propylated cyclodextrin, hydroxy propylated methyl ether cyclodextrin and hydroxy propylated isopropyl ether cyclodextrin.

The gas chromatography is performed in a conventional manner.

Permethylated hydroxy ethers of cyclodextrin are liquids at room temperature and can be used to coat undeactivated fused silica capillaries. They are nonvolatile and are thermally stable at temperatures up to about 300° C. in the absence of oxygen.

Although it is less common, enantioselective reversals also can occur among like-derivatized alpha-, beta, and gamma-cyclodextrins. Reversals in elution order have been observed between alpha- and beta-cyclodextrin and between beta- and gamma-cyclodextrin.

Further details and advantages of the present invention may be more fully understood by reference to the following examples.

EXAMPLE 1

This example illustrates making a permethylated hydroxypropylated cyclodextrin.

The permethyl hydroxypropyl cyclodextrins were made in two steps. First, propylene oxide, sodium hydride and the desired cyclodextrin (either alpha-, beta-, or gamma-) were dissolved in DMSO at 60° C. and allowed to react for one hour with stirring. After cooling to room temperature for 15 hours, the mixture was further cooled in an ice bath. Excess methyl iodide was added dropwise. After 24 hours the reaction was complete.

EXAMPLE 2

This example illustrates separating optical isomers using the media made in Example 1 above. The optical isomers were derivatized in order to decrease their volatility for better resolution in the gas chromatograph process.

Fused silica capillary tubes (0.25 mm ID) were obtained from Alltech. The capillaries were coated via the static method.

Racemic mixtures of amines and alcohols to be resolved were derivatized with trifluoroacetic anhydride, acetic anhydride or chloroacetic anhydride. All anhydrides were obtained from Aldrich. In each case, approximately 1.0 mg of the racemic analyte was dissolved in 0.5 ml of methylene chloride and 200 $\mu$l of the desired anhydride added. After reaction, dry nitrogen was bubbled through the solution to remove excess reagent. Racemic mixtures of sugars to be resolved were trifluoroacetylated by the above procedure except that tetrahydrofuran was used as the solvent. Also, because this reaction was somewhat slower and the trifluoroacetic anhydride was volatile, three additional aliquots of trifluoroacetic anhydride was added at seven minute intervals.

Both Hewlett Packard (5710A) and Varian (3700) gas chromatographs were used for all separations. Split injection and flame ionization detection were utilized. The injection port temperature was 200° C. and nitrogen was used as the carrier gas.

Tables IA, IB, and IC illustrates the results using alpha-, beta- and gamma-cyclodextrin, respectively.

The separation factor, $\alpha$, is a measure of the peak to peak separation, the greater the separation the greater is $\alpha$. Mathematically, it is defined as the ratio of the corrected retention times of the two peaks being compared (i.e., $$\alpha = \frac{t_2'}{t_1'} = \frac{t_2 - t_0}{t_1 - t_0}$$

where $t'$ = corrected retention time, $t$ = uncorrected time and $t_0$ = retention time of an unretained compound. Traditionally, the longest retained peak time, $t_2$, is put in the numerator so that $\alpha$ will be greater than 1. An $\alpha$-value of 1 means that there is no separation (the peaks co-elute).

TABLE Ia

Alpha-Cyclodextrin
(DS by hydroxypropyl = average about 7, ranged between 2–12)

| Structure | Compound | Column Length (m) | Temperature (°C.) | R | α | Elution Order (if known) |
|---|---|---|---|---|---|---|
| Sugars* allose structure (CH₂OR, OH, HO, OH, OH) | allose | 9 | 100 | —C(=O)—CF₃ | 1.10 | — |
| ribose structure (ROCH₂, OH, OH, OH) | ribose | 9 | 100 | —C(=O)—CF₃ | 1.02 | — |
| Alcohols isopinocamphenol structure (OR) | isopinocamphenol | 9 | 90 | —C(=O)—CF₃ | 1.01 | — |
| trans-1,2-dithiane-4,5-diol structure (S, S, OR, OR) | trans-1,2-dithiane-4,5-diol | 9 | 100 | —C(=O)—CF₃ | 1.12 | — |
| 1,2,3,4-tetrahydro-1-naphthol structure (OR) | 1,2,3,4-tetrahydro-1-naphthol | 9 | 100 | —C(=O)—CF₃ | 1.03 | S,R — |
| Amines 3-aminoheptane structure (NHR) | 3-aminoheptane | 9 | 90 | —C(=O)—CF₃ | 1.04 | — |
| 2-aminoheptane structure (NHR) | 2-aminoheptane | 9 | 90 | —C(=O)—CF₃ | 1.05 | — |
| 1,5-dimethylhexylamine structure (NHR) | 1,5-dimethylhexyl-amine | 9 | 90 | —C(=O)—CF₃ | 1.04 | — |
| 1-phenyl ethyl amine structure (NHR) | 1-phenyl ethyl amine | 9 | 90 | —C(=O)—CF₃ | 1.02 | — |
| 1,2,3,4-tetrahydro-1-naphthylamine structure (NHR) | 1,2,3,4-tetrahydro-1-naphthylamine | 9 | 130 | —C(=O)—CF₃ | 1.03 | — |

TABLE Ia-continued

Alpha-Cyclodextrin
(DS by hydroxypropyl = average about 7, ranged between 2-12)

| Structure | Compound | Column Length (m) | Temperature (°C.) | R | α | Elution Order (if known) |
|---|---|---|---|---|---|---|
| [1-(naphthyl)methyl-NHR with naphthalene] | 1-(1-naphthyl)-ethylamine | 9 | 150 | —C(=O)—CF₃ | 1.03 | S,R |
| Amino Alcohols | | | | | | |
| [CH₃O-CH₂-CH(NHR)-CH₃] | 2-amino-1-methoxy-propane | 9 | 100 | —C(=O)—CH₃ | 1.03 | — |
| [RO-CH₂-CH(NHR)-CH₃] | 2-amino-1-propanol | 9 | 120 | —C(=O)—CH₃ | 1.02 | — |
| [RHN-CH₂-CH(OR)-CH₃] | 1-amino-2-propanol | 9 | 120 | —C(=O)—CH₃ | 1.01 | — |
| [RO-CH₂-CH(NHR)-CH₂CH₃] | 2-amino-1-butanol | 9 | 120 | —C(=O)—CH₃ | 1.02 | — |
| Bicyclic Compounds | | | | | | |
| [exo-norbornane-NHR] | exo-2-amino-norbornane | 9 | 100 | —C(=O)—CF₃ | 1.01 | — |
| [endo-norbornane-NHR] | endo-2-amino-norbornane | 9 | 90 | —C(=O)—CF₃ | 1.02 | — |

*only D-form is shown

TABLE Ib

Beta-Cyclodextrin
(DS by hydroxypropyl = average 8, range 2-14)

| Structure | Compound | Column Length (m) | Temperature (°C.) | R | α | Elution Order (if known) |
|---|---|---|---|---|---|---|
| Alcohols | | | | | | |
| [1,2-dithiane with OR groups] | trans-1,2-dithiane-4,5-diol | 10 | 100 | —C(=O)—CF₃ | 1.06 | — |
| [isopinocamphenyl-OR] | isopinocamphenol | 10 | 90 | —C(=O)—CF₃ | 1.10 | — |

TABLE Ib-continued

Beta-Cyclodextrin
(DS by hydroxypropyl = average 8, range 2–14)

| Structure | Compound | Column Length (m) | Temperature (°C.) | R | α | Elution Order (if known) |
|---|---|---|---|---|---|---|
| OR on tetrahydronaphthalene | 1,2,3,4-tetrahydro-1-naphthol | 20 | 120 | $-\overset{O}{\underset{\|\|}{C}}-CF_3$ | 1.07 | R,S |
| OR on indane (bicyclic) | 1-indanol | 20 | 110 | $-\overset{O}{\underset{\|\|}{C}}-CF_3$ | 1.05 | — |
| | trans-cyclohexane 1,2 diol | 30 | | $-\overset{O}{\underset{\|\|}{C}}CH_2Cl$ | 1.05 | — |

Amino Alcohols

| Structure | Compound | Column Length (m) | Temperature (°C.) | R | α | Elution Order (if known) |
|---|---|---|---|---|---|---|
| NHR, O-CH₃ on propane | 2-amino-1-methoxy propane | 20 | 110 | $-\overset{O}{\underset{\|\|}{C}}-CH_3$ | 1.06 | — |
| NHR, OR on propanol | 2-amino-1-propanol | 20 | 120 | $-\overset{O}{\underset{\|\|}{C}}-CH_3$ | 1.04 | — |
| RHN, OR on propane | 1-amino-2-propanol | 20 | 120 | $-\overset{O}{\underset{\|\|}{C}}-CH_3$ | 1.06 | — |
| NHR, OR on propanol | 2-amino-1-propanol | 30 | 120 | $-\overset{O}{\underset{\|\|}{C}}CH_2Cl$ | 1.04 | — |
| NHR, O-CH₃ on propane | 2-amino-1-methoxy propane | 30 | 120 | $-\overset{O}{\underset{\|\|}{C}}CH_2Cl$ | 1.07 | — |
| RO, NHR on butanol | 2-amino-1-butanol | 20 | 120 | $-\overset{O}{\underset{\|\|}{C}}-CH_3$ | 1.05 | — |
| RO, NHR on methylbutanol | 2-amino-3-methyl-butanol | 10 | 120 | $-\overset{O}{\underset{\|\|}{C}}-CH_3$ | 1.03 | — |

Amines

| Structure | Compound | Column Length (m) | Temperature (°C.) | R | α | Elution Order (if known) |
|---|---|---|---|---|---|---|
| NHR on pentane | 2-aminopentane | 9 | 70 | $-\overset{O}{\underset{\|\|}{C}}-CF_3$ | 1.05 | — |
| NHR on dimethylbutane | 1,3-dimethylbutyl-amine | 9 | 70 | $-\overset{O}{\underset{\|\|}{C}}-CF_3$ | 1.04 | — |
| NHR on heptane | 3-aminoheptane | 9 | 80 | $-\overset{O}{\underset{\|\|}{C}}-CF_3$ | 1.08 | — |

TABLE Ib-continued

Beta-Cyclodextrin
(DS by hydroxypropyl = average 8, range 2–14)

| Structure | Compound | Column Length (m) | Temperature (°C.) | R | α | Elution Order (if known) |
|---|---|---|---|---|---|---|
| (NHR, heptane chain) | 2-aminoheptane | 9 | 80 | —C(=O)—CF₃ | 1.12 | — |
| (NHR, 1,5-dimethylhexyl) | 1,5-dimethylhexyl amine | 9 | 80 | —C(=O)—CF₃ | 1.15 | — |
| (NHR-CH-cyclohexyl) | 1-cyclohexyl-ethylamine | 9 | 100 | —C(=O)—CF₃ | 1.05 | — |
| (NHR-CH-phenyl) | 1-phenyl-ethyl-amine | 9 | 100 | —C(=O)—CF₃ | 1.04 | — |
| (NHR-indan) | 1-aminoindan | 20 | 150 | —C(=O)—CF₃ | 1.01 | — |
| (NH₂-CH-cyclohexyl) | 1-cyclohexylethyl-amine | 30 | | —C(=O)—CH₃ | 1.05 | — |
| | 1-(alpha-naphythyl)-ethylamine | 30 | | —CCH₃ (=O) | 1.02 | — |
| (NHR-tetrahydronaphthyl) | 1,2,3,4-tetrahydro-1-naphthylamine | 20 | 150 | —C(=O)—CF₃ | 1.04 | — |

Nicotine Compounds

| | | 20 | 140–180 | —C(=O)—CF₃ | 1.01 / 1.00 | — |

(pyridyl-pyrrolidine with N—C(=O)—CF₃)

Lactones

| | β,β-dimethyl-γ-(hydroxymethyl)-γ-butyrolactone | 9 | 100 | —C(=O)—CF₃ | 1.02 | — |

(RO—CH₂—butyrolactone structure)

TABLE Ib-continued

Beta-Cyclodextrin
(DS by hydroxypropyl = average 8, range 2–14)

| Structure | Compound | Column Length (m) | Temperature (°C) | R | α | Elution Order (if known) |
|---|---|---|---|---|---|---|
| (structure with NH₂, O, O) | α-amino-γ-butyrl lactone | 30 | 100 | —C(=O)CH₃ | 1.03 | — |
| Sugars | | | | | | |
| CH₂OR, OH OH (OH), HO (pyranose) | mannose | 9 | 90 | —C(=O)—CF₃ | 1.02 | — |
| CH₂OR, HO, OH (OH), OH (pyranose) | galactose | 9 | 100 | —C(=O)—CF₃ | 1.05 | — |
| ROCH₂, OH, OH OH (furanose) | ribose | 9 | 100 | —C(=O)—CF₃ | 1.08 | D,L |
| (pyranose with OH, H(OH), HO, OH) | arabinose | 9 | 90 | —C(=O)—CF₃ | 1.04 | D,L |
| (pyranose with OH, H(OH), HO, OH) | xylose | 9 | 80 | —C(=O)—CF₃ | 1.03 | L,D |
| (pyranose with OH, HO, OH, OH) | lyxose | 9 | 80 | —C(=O)—CF₃ | 1.04 | D,L |
| CHO, —OH, —OH, CH₂OR | erythrose | 20 | 80 | —C(=O)—CF₃ | 1.03 | L,D |
| HO, OH, (CH₂OH)OH, OH (pyranose) | sorbose | 9 | 90 | —C(=O)—CF₃ | 1.12 | L,D |

TABLE Ib-continued

Beta-Cyclodextrin
(DS by hydroxypropyl = average 8, range 2–14)

| Structure | Compound | Column Length (m) | Temperature (°C.) | R | α | Elution Order (if known) |
|---|---|---|---|---|---|---|
| (pyranose ring with OCH₃, HO, OH) | 1-O-methyl-β-D,L-arabinopyranoside | 20 | 90 | −C(=O)−CF₃ | 1.09 | D,L |
| CHO−CH(−)−CH₂OR | glyceraldehyde | 30 | 130 | −C(=O)−CH₃ | 1.04 | — |
| Bicyclic Compounds | | | | | | |
| (norbornene with OR) | 5-norbornen-2-ol | 9 | 60 | −C(=O)−CF₃ | 1.00 / 1.10 | — |
| (norbornane with H,H and OR) | exo-norbornenol | 9 | 70 | −C(=O)−CF₃ | 1.04 | — |
| Miscellaneous | | | | | | |
| C−C(=O)−C(OR)−O(CH₂)₃CH₃ | butyl lactate | 9 | 60 | −C(=O)−CF₃ | 1.04 | — |

TABLE Ic

Gamma-Cyclodextrin
(DS by hydroxypropyl = average about 9, range between 2–16)

| Structure | Compound | Column Length (m) | Temperature (°C.) | R | α | Elution Order (if known) |
|---|---|---|---|---|---|---|
| RO−CH₂−CH(NHR)−CH₃ | 2-amino-1-propanol | 9 | 120 | −C(=O)−CH₃ | 1.02 | — |
| Ph−CH(NHR)−CH₃ | 1-phenyl-ethylamine | 9 | 100 | −C(=O)−CF₃ | 1.04 | — |
| CH₃−CH(NHR)−(CH₂)₄−CH₃ | 2-aminoheptane | 9 | 90 | −C(=O)−CF₃ | 1.02 | — |
| (1,5-dimethylhexyl with NHR) | 1,5-dimethylhexyl-amine | 9 | 90 | −C(=O)−CF₃ | 1.03 | — |
| (dithiane ring with two OR) | trans-1,2-dithiane 4,5-diol | 9 | 100 | −C(=O)−CF₃ | 1.03 | — |

TABLE Ic-continued

| | Gamma-Cyclodextrin (DS by hydroxypropyl = average about 9, range between 2–16) | | | | | |
|---|---|---|---|---|---|---|
| Structure | Compound | Column Length (m) | Temperature (°C.) | R | α | Elution Order (if known) |
| (CH₂OR on dioxolane ring) | solketal | 9 | 70 | $-\overset{\text{O}}{\underset{\|}{C}}-CF_3$ | 1.02 | — |

EXAMPLE 3

This example illustrates separating nonderivatized optical isomers using the the media made in Example 1 above.

The capillary tubes and the gas chromatographs were as set forth in Example 2 above.

Tables IIa, IIb and IIc illustrate the results using alpha-, beta-, and gamma-cyclodextrin, respectively.

TABLE IIa

| | Alpha-Cyclodextrin (DS by hydroxypropyl = average about 7, range between 2–12) | | | | |
|---|---|---|---|---|---|
| Structure | Compound | Column Length (m) | Temperature (°C.) | α | Elution Order (if known) |
| | limonene oxide | 9 | 90 | 1.06 1.20 | — |
| | limonene | 9 | 70 | 1.03 | — |
| | carvon | 9 | 100 | 1.02 | — |
| | 4-phenyl-1,3-dioxane | 9 | 100 | 1.03 | — |
| | mandelic acid methyl ester | 9 | 120 | 1.04 | — |
| | mandelic acid ethyl ester | 9 | 120 | 1.03 | R,S |

Lactones

TABLE IIa-continued

Alpha-Cyclodextrin
(DS by hydroxypropyl = average about 7,
range between 2–12)

| Structure | Compound | Column Length (m) | Temperature (°C.) | α | Elution Order (if known) |
|---|---|---|---|---|---|
| | γ-phenyl-γ-butyro lactone | 9 | 130 | 1.02 | — |

Bicyclic Compounds

| | exo-2-bromo- norbornan | 9 | 90 | 1.01 | — |

Furan and Pyran Derivatives

| | 2-ethoxy-tetra hydrofuran | 9 | 60 | 1.22 | — |
| | 3,4-dihydro-2- methoxy-2H-pyran | 9 | 60 | 1.06 | — |
| | 3,4-dihydro-2-ethoxy- 2H-pyran | 9 | 60 | 1.16 | — |
| | 2,5-dimethoxy-3- tetrahydrofuran carboxaldehyde | 9 | 90 | 1.03 1.02 1.05 1.08 | — |

TABLE IIb

Beta-Cyclodextrin
(DS by hydropropyl = average about 8,
range between 2–14)

| Structure | Compound | Column Length (m) | Temperature (°C.) | α | Elution Order (if known) |
|---|---|---|---|---|---|
| Alcohols | | | | | |
| | 2-amino-4-methyl 1-butanol | 30 | | 1.11 | — |
| | trans-1,2-cyclo- hexanediol | 20 | 120 | 1.04 | — |
| | trans-1,2-cyclo- heptanediol | 20 | 120 | 1.03 | — |

Nicotine Compounds

TABLE IIb-continued

| | Beta-Cyclodextrin (DS by hydropropyl = average about 8, range between 2-14) | | | |
|---|---|---|---|---|
| Structure / Compound | Column Length (m) | Temperature (°C.) | α | Elution Order (if known) |
| [pyridine-pyrrolidine-CF₂H structure] | 20 | 120~180 | 1.01 | — |
| [pyridine-CH₂-pyrrolidine-C(=O)CF₃ structure] | 20 | 140~180 | 1.01 | — |

Lactones

| Structure / Compound | Column Length (m) | Temperature (°C.) | α | Elution Order |
|---|---|---|---|---|
| pantoyl lactone | 20 | 120 | 1.04 | — |
| N-acetyl-homocystein thiolactone | 20 | 150 | 1.02 | — |
| β-butyrolactone | 9 | 70 | 1.03 | — |
| α-methyl-γ-butyro lactone | 9 | 70 | 1.02 | — |
| α-acetyl-α-methyl-γ-butyrolactone | 9 | 90 | 1.06 | — |

Furan and Pyran Derivatives

| Structure / Compound | Column Length (m) | Temperature (°C.) | α | Elution Order |
|---|---|---|---|---|
| 2-ethoxy-tetrahydro-furan | 9 | 50 | 1.11 | — |
| 3,4-dihydro-2-methoxy-2H-pyran | 9 | 50 | 1.03 | — |
| 3,4-dihydro-2-ethoxy-2-H-pyran | 9 | 50 | 1.05 | — |
| tetrahydro-2-(2-propynyloxy)-2H-pyran | 9 | 60 | 1.05 | — |

TABLE IIb-continued

Beta-Cyclodextrin
(DS by hydropropyl = average about 8, range between 2-14)

| Structure | Compound | Column Length (m) | Temperature (°C.) | α | Elution Order (if known) |
|---|---|---|---|---|---|
| | 2,5-dimethoxy-3-tetrahydrofuran carboxyaldehyde | 9 | 100 | 1.05<br>1.10<br>1.09<br>1.02 | — |

Epoxides and Glycidyl Analogues

| Structure | Compound | Column Length (m) | Temperature (°C.) | α | Elution Order (if known) |
|---|---|---|---|---|---|
| | 1,2-epoxy-hexane | 20 | 50 | 1.02 | — |
| | 1,2-epoxyoctane | 20 | 50 | 1.01 | — |
| | 1,2-epoxy-7-octene | 20 | 50 | 1.02 | — |
| | styrene oxide | 9 | 80 | 1.06 | — |
| | limonene oxide | 20 | 100 | 1.02<br>1.03 | — |
| | glycidyl methyl ether | 20 | 45 | 1.04 | — |
| | glycidyl isopropyl ether | 20 | 45 | 1.03 | — |
| | allyl glycidyl ether | 20 | 45 | 1.05 | — |
| | t-butyl glycidyl ether | 20 | 45 | 1.06 | — |
| | glycidyl methacrylate | 20 | 70 | 1.01 | — |

Bicyclic Compounds

| Structure | Compound | Column Length (m) | Temperature (°C.) | α | Elution Order (if known) |
|---|---|---|---|---|---|
| | 2-acetyl-5-nornbornene | 9 | 90 | 1.00<br>1.07 | — |

TABLE IIb-continued

Beta-Cyclodextrin
(DS by hydropropyl = average about 8, range between 2–14)

| Structure | Compound | Column Length (m) | Temperature (°C.) | α | Elution Order (if known) |
|---|---|---|---|---|---|
| | 3-chloro-2-nor-bornanone | 9 | 90 | 1.00 1.05 | — |
| | exo-2-bromonor-bornanone | 9 | 90 | 1.06 | — |

Miscellaneous

| Structure | Compound | Column Length (m) | Temperature (°C.) | α | Elution Order (if known) |
|---|---|---|---|---|---|
| | limonene | 20 | 100 | 1.03 | — |
| C—C—C—O—(CH$_2$)$_3$CH$_3$ with OH | butyl lactate | 9 | 60 | 1.02 | — |
| solketal structure | solketal | 9 | 80 | 1.04 | — |
| Cl$_3$C structure | α-(trichloromethyl)-benzyl acetate | 20 | 140 | 1.03 | — |

TABLE IIc

Gamma-Cyclodextrin
(DS by hydroxypropyl = average about 9, range between 2–16)

| Structure | Compound | Column Length (m) | Temperature (°C.) | α | Elution Order (if known) |
|---|---|---|---|---|---|
| | 2-(bromomethyl)-tetra hydrofuran | 9 | 70 | 1.02 | — |
| | limonene oxide | 9 | 70 | 1.03 1.03 | — |

TABLE IIc-continued

Gamma-Cyclodextrin
(DS by hydroxypropyl = average about 9,
range between 2–16)

| Structure | Compound | Column Length (m) | Temperature (°C.) | α | Elution Order (if known) |
|---|---|---|---|---|---|
| (structure with O, OCH₂CH₃) | 3,4-dihydro-2-ethoxy 2H-pyran | 9 | 50 | 1.04 | — |

EXAMPLE 4

A test was made to determine if the stereochemistry of the ether side chain has any effect on separation.

Three different media were prepared, permethyl-(S)-hydroxypropyl-beta-cyclodextrin; permethyl-(R)-hydroxypropyl-beta cyclodextrin; and permethyl-(racemic)-hydroxypropyl-beta-cyclodextrin.

Three identical columns were coated with these materials and a series of tests were run. Each of the three columns produced essentially identical separations.

It will be understood that it is intended to cover all changes and modifications of the preferred embodiments herein chosen for the purpose of illustration which do not constitute a departure from the spirit and scope of the invention.

What is claimed is:

1. A composition for separation of optical isomers in a gas chromatographic column, said composition comprising a permethylated hydroxy ether of cyclodextrin having about 10% to about 75% of the hydroxyl groups of the cyclodextrin substituted with hydroxy ether side chains and substantially all of the hydroxyl groups of the hydroxy ether of cyclodextrin substituted with methyl groups.

2. The composition of claim 1 wherein the cyclodextrin is beta-cyclodextrin.

3. The composition of claim 1 wherein the cyclodextrin is gamma-cyclodextrin.

4. The composition of claim 1 wherein the cyclodextrin is alpha-cyclodextrin.

5. The composition of claim 1 wherein the hydroxy ether of cyclodextrin is selected from the group consisting of hydroxy propylated cyclodextrin, hydroxy propylated methyl ether cyclodextrin, hydroxy propylated isopropyl ether cyclodextrin, hydroxy propylated vinyl ether cyclodextrin, hydroxy propylated t-butyl ether cyclodextrin, and hydroxy ethylated phenyl cyclodextrin.

6. A composition made by the process comprising:
   (a) etherifying a cyclodextrin with an epoxide to form an hydroxy ether of cyclodextrin having between about 105 to about 75% of the hydroxyl groups on said cyclodextrin substituted by said epoxide; and
   (b) permethylating substantially all of the hydroxyl groups on said hydroxy ether of cyclodextrin.

7. The composition of claim 6 wherein said cyclodextrin is selected from the group consisting of alpha-, beta-, and gamma-cyclodextrin.

8. The composition of claim 6 wherein said epoxide is selected from the group consisting of ethylene oxide, propylene oxide, butylene oxide, amylene oxide, glycidol (hydroxypropylene oxide), butadiene oxide, glycidyl methyl ether, glycidyl isopropyl ether, alkyl glycidyl ether, styrene oxide, and t-butyl glycidyl ether.

9. A method for separation of compounds by means of gas chromatography comprising:
   (a) passing a mixture of compounds having different structure through a column packed with a permethylated hydroxy ether of cyclodextrin; and
   (b) eluting separated individual compounds from said column.

* * * * *